{{PAGE_START}}

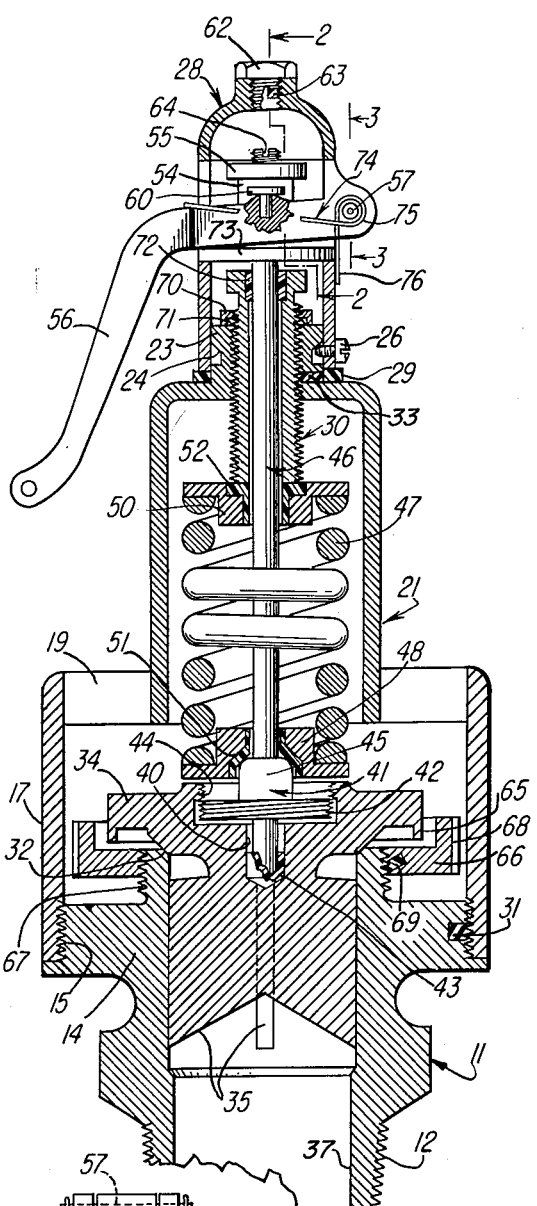

3,019,811
RELIEF VALVE EMBODYING ANTI-VIBRATION STRUCTURE
Maurice W. Young, Fort Wayne, Ind., and Albert C. Schrimshaw, Haviland, Ohio, assignors to Kunkle Valve Company, Fort Wayne, Ind., a partnership
Filed Mar. 10, 1958, Ser. No. 720,271
3 Claims. (Cl. 137—543.13)

The invention relates to new and improved valves and has reference in particular to spring-loaded pressure relief valves incorporating anti-vibration structure.

A preferred type of safety or relief valve which is equipped with improved structure especially adapting the same for easy adjustment and for manual testing is disclosed in the Patent No. 2,834,372, granted May 13, 1958, and entitled Valve Construction. Valves of this character are used in many instances as a safety measure where they serve to automatically open for preventing the pressure from exceeding a predetermined set limit. The valves are generally mounted on pipes, tubes or conduits and located near a compressor or similar operating machine so that said valves are subjected to vibration of such nature as to seriously interfere with the normal operation of the valve and which also has a tendency to cause excessive wear on the valve parts.

It is an object of the present invention to provide anti-vibration structure for valves which will render said valves suitable for use with all types of systems and/or installations where vibration may be present.

Another object is to provide a safety or relief valve embodying new and improved anti-vibration structure designed to insulate and protect the various connected or contacting parts of the valve from one another and which will thus materially reduce the wear on the parts and increase the opertaing life of the valve.

Another object is to provide a safety or relief valve wherein anti-vibration structure is incorporated between certain threaded parts and between certain contacting parts of the valve for dampening the vibrations to which the said parts may be subjected, whereby the valve is rendered more efficient in its operations and which continue for a longer period of time without requiring periodic adjustments.

A more specific object is to employ plastic inserts for either insulating or locking certain component parts of the valve for more effectively resisting vibrations to which the parts may be subjected.

With these and other objects in view, the invention may consist of certain novel features of construction and operation as will be more fully described and particularly pointed out in the specification, drawings and claims appended thereto.

In the drawings which illustrate an embodiment of the invention and wherein like reference characters are used to designate like parts:

FIGURE 1 is a sectional view taken vertically through a relief valve embodying the improved anti-vibration structure of the invention;

FIGURE 2 is a detail sectional view taken substantially along line 2—2 of FIGURE 1;

FIGURE 3 is another sectional view showing in detail the pivot structure for the manual release lever;

FIGURE 4 is another detail sectional view taken substantially along line 4—4 of FIGURE 1; and FIGURE 5 is a sectional view taken substantially along line 5—5 of FIGURE 3 and showing the torsion spring and its associated relation with the manually operable lever.

As shown in the drawings, the valve construction comprises a body member 11 having its lower portion threaded at 12 for connection to piping or other portions of a pressure system to be controlled by the valve. The upper portion of the body member is provided with a conventional shoulder 14 threaded at 15 for receiving the cap or housing member 17. This member 17 comprises a lower cylindrical wall portion connected by radialy extending arms 19 with an interior cylindrical upper portion 21. This upper portion 21 terminates at a reduced extension 23 having a circumferential recess 24 for receiving the set screw 26. The said set screw passes through a hood 28 to retain the hood in position on the upper part of the cap or housing member. The upper reduced extension portion 23 of the housing member is internally threaded to receive the pressure adjusting screw sleeve 30.

The body member 11 is provided with an insert 31 of plastic material such as nylon or the like which is inserted into the body following the formation of the threads thereon. When the member 17 is threaded to the body member 11 the threads cut their way into the plastic insert 31 forming threads thereon and since the plastic insert is somewhat resilient, the same expands into the grooves of the threads on the body member thus forming a friction lock between two members.

The body member 11 is also provided with a valve seat 32 to receive a mating portion of the valve disc 34. As shown in the drawings, the lower portion of the valve disc is provided with radially extending fins 35 which slidably interfit with the tubular inner surface 37 of the valve member. The interfit serves to guide the valve 34 in its movement upwardly and downwardly upon operation thereof. The valve disc 34 is provided in its upper face with an axially located recess 40 into which is fitted a pressure pin 41. The pin has an upper circumferential shoulder portion 42 which is exteriorly threaded for threaded relation with the portion 44 provided by valve disc 34.

It will be observed that the pressure pin in threaded into and through the portion 44 of the valve disc so as to loosely retain the pressure pin within the cavity of the valve disc, preventing inadvertent release thereof but allowing relative movement of the parts particularly in an axial direction. The lower end of the pressure pin having location within recess 40 is adapted to receive a cup 43 of any suitable plastic material such as nylon and accordingly the cup member 43 serves to isolate the pressure pin from the valve disc. Actually said insert 43 functions in a manner to dampen the vibrations to which the parts may be subjected and thus deterioration and excessive wear such as may be caused by high frequency vibrations are either completely eliminated or materially reduced.

The pressure pin is formed to provide a dome-shaped projection 45 projecting some distance above the shoulder portion 42 and to which the spindle 46 is suitably secured, such as by being threaded thereto or by being welded to the dome-shaped portion 45. The loading spring, indicated by numeral 47, has its lower end in contact with a bottom thrust collar 48, whereas the top end of the loading spring 47 is in contact with the top thrust collar 50. The spindle 46 extends through both the collars substantially axially thereof and in accordance with the invention both thrust collars carry plastic inserts for dampening the vibrations to which the parts may be subjected. The insert 51 carried by the bottom thrust collar 48 is substantially in the form of an inverted cup so that the spindle 46 extends through the insert and which has contact with and rides on the dome-shaped portion 45 of the pressure pin. The ball and socket effect thus created mounts the lower thrust collar on the pressure pin in a tiltable manner whereby thrust is equally applied universally thereto. The insert 52 is carried by the top thrust collar 50 and said insert also has frictional contact with the spindle and contact with the adjusting screw sleeve 30.

The upper end of the spindle 46 is threaded to receive the nut 54 which is provided with a laterally extending flange 55. The manually operable lever 56 is pivoted to the hood or cap 28 by means of a pivot pin 57 which according to the invention is formed of a plastic such as nylon and thus the plastic pin replaces the metal pin heretofore used. As best shown in FIGURES 2 and 3, the manually operable lever 56 is formed with bifurcated arms 58 and which straddle the nut 54 and are also located on respective sides of the wall portion of the cap which receives the pivot pin 57. Each arm 58 is provided with a pin 60 and which is positioned directly under the flange 55 of the nut 54 so that upon actuation of lever 56 it will be understood that the pins 60 will contact the flange 55 of the nut and in so doing the manually operable lever will thus lift the spindle 46, allowing releasing action of the valve disc 34 to take place. A plastic pin 61, preferably of nylon plastic, is carried by the nut 54 and said pin serves to lock the nut to the spindle. The top of the hood 28 is provided with an axial opening which is normally closed by the nut 62 having an insert 63 of nylon plastic for locking the parts in assembled relation and which prevents their inadvertent separation should the valve be subjected to intense vibration.

It is necessary to hold the spindle against rotation when the screw sleeve 30 is being rotated for adjusting the pressure exerted by coil spring 47. It is also necessary to maintain the spindle in a fixed position when the nut 54 is being rotated to adjust the position of the nut with respect to the manually operable lever. For this purpose the spindle is provided with a screw driver slot 64 at its extreme upper end and which is located directly below the opening in the top end of the hood so that upon removal of nut 62 the operator can hold the stem against rotation while effecting adjusting movement of either the nut 54, the screw 30, or both.

The hood 28 is provided with the set screw 26 which is adapted to ride within the circumferential groove 24 formed in the extension 23 of the member 17. The plastic insert 29 is interposed between the hood 28 and the member 17 so as to insulate the parts and prevent the transmission of vibrations from the member 17 to the hood and connecting parts of the valve. The said insert 29 may be of nylon or other suitable plastic. A pin 33 of similar material is employed for releasably holding the threaded sleeve 30 in adjusted position as regards the extension 23.

The valve disc 34 is provided with a downwardly extending circumferential flange 65, the same extending completely around its outer periphery. An adjustable collar 66 is threaded on the upper portion 67 of the body member 11, the said collar providing an upwardly extending circumferential flange 68. The latter flange, namely, 68, surrounds and is spaced from the downwardly extending flange 65 of the valve disc so that by adjustment of the collar 66 it is possible to vary the relationship between the flanges 65 and 68 to provide a huddling chamber of the proper and desired proportions. The nylon insert 69 is carried by the collar 66 for the purpose of aiding in locking the collar to the body member 11.

In assembling the valve it will be apparent that the parts are brought to the position shown in cross section in FIGURE 1. This is accomplished by threading the portion 42 of the pressure pin completely through portion 44 of the valve disc. The operating pressure of the valve is then adjusted by screwing down the screw sleeve 30 and locking it in adjusted position by lock nut 70 having the plastic insert 71. It will also be observed that the pressure adjusting screw sleeve 30 is similarly provided with a plastic insert, namely, 72, the same having frictional contact with the spindle 46. The said insert 72 functions to isolate the spindle from the pressure screw. The other parts of the valve including hood 28 and the manual operating lever 56 are then assembled as shown, so that actuation of the lever in an upward direction will effect a release of the valve disc 34 for testing purposes although at other times the coil spring 47 is operative to yieldingly maintain the valve disc in contact with the valve seat 32 provided therefor by the body member 11.

It is desirable to yieldingly hold the lever 56 in a release position wherein the lever will have contact with the collar 73 formed of any suitable plastic material such as nylon or Teflon. Accordingly a torsion spring 74 is fitted on the lever, as best shown in FIGURES 1 and 5, the said torsion spring having coils 75 which are looped around the pivot pin 57. The depending leg from each coil bears against the hood 28 at 76, whereas each horizontal leg 77 is disposed over and has contact with a bifurcated arm 58 of said lever. The spring 74 is thus in tension at all times and its effect is to exert a downward force on the lever causing it to rest firmly against the plastic collar 73.

It will be apparent that when the fluid pressure in the tubular central opening 37 of member 11 is adequate to overcome the spring-loading as effected by coil spring 47, the said valve disc will be lifted from its valve seat to permit escape of the pressure fluid. The fluid first flows through the huddling chamber and then escapes from the valve by flowing through the passageways formed by the radially extending arms 19. This upward movement of the valve disc 34 is transmitted by the pressure pin 41 to the bottom thrust collar 48 and then to the coil spring 47, causing compression of the spring. When the pressure within passage 37 has been reduced to below a predetermined set maximum, as determined by coil spring 47, said spring will return valve disc 34 to seating contact again with its valve seat 36 on member 11 and the parts are ready for another operation, either automatic, due to excessive pressure within the system, or for testing purposes, as by actuation of the manual operating lever 56.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. A relief valve comprising a body member providing a valve seat, a valve disc slidably fitted in the body member and having a portion adapted to engage the valve seat, a pressure pin fitted into the upper face of the valve disc, a first member of synthetic resin material interposed between the pressure pin and the valve disc for isolating and shielding the parts from each other, a bottom spring thrust collar having a tiltable thrust engagement with the pressure pin, and said pressure pin having a portion loosely fitting under a portion of the valve disc, a pressure spring having its lower end engaging the thrust collar, a top thrust collar in contact with the top end of the spring, a spindle secured to the pressure pin and extending up through the spring and thrust collars, said spindle having a connected relation with the bottom thrust collar whereby upward movement of the spindle moves the bottom thrust collar upwardly and also moves the valve disc upwardly through the loosely fitting portions, means for lifting the spindle, a pressure adjusting screw member supported above the body member and engaging the upper face of the top thrust collar, a second member also of synthetic resin material and which is carried by the bottom thrust collar for contact with the pressure pin, and a third member of synthetic resin material supported by the top thrust collar and through which the spindle extends for isolating and shielding the top thrust collar with respect to the spindle and with respect to the pressure adjusting screw member.

2. A relief valve of the character as defined by claim 1, wherein the first, second and third members are formed of a nylon plastic to provide anti-vibration inserts for protecting the various parts of the valve from excessive wear due to vibration, and wherein the tiltable thrust engagement of the bottom thrust collar with the pressure pin is provided for by the second member which has a ball and socket contact with the pressure pin.

3. A relief valve comprising a housing and a body member having a valve seat, a valve disc having a seat-engaging portion and being reciprocable within the body member, a pressure pin having contacting relation with the valve disc, a bottom spring thrust member engaging the pressure pin and operative for transmitting downward thrust thereto whereby to maintain the seat-engaging portion of the valve disc on the valve seat, a spindle fixed to the pressure pin and having a portion extending through the bottom spring thrust member, a top thrust member in surrounding relation with said spindle, a pressure spring having its lower end supported by the bottom spring thrust membre and having its other end in contact with the top thrust member, a pressure adjusting screw supported by the housing and adapted to contact the top face of the top thrust member, said spindle also extending through the pressure adjusting screw and beyond, a nut secured to that portion of the spindle projecting beyond the said screw, a lever having extending arms in associated relation with the nut, a pivot pin formed of durable plastic material pivotally connecting the lever to the housing whereby actuation of the lever to apply thrust to the nut will effect a lifting of the spindle to also lift the bottom spring thrust member and the valve disc, a torsion spring in associated relation with the lever, said torsion spring including coils looped around the respective ends of the pivot pin and a leg portion depending from each coil and contacting the housing, and said torsion spring also having a horizontal leg portion extending from each coil and being positioned over and contacting the arms, respectively, of the lever whereby the lever is yieldingly maintained in a release position.

References Cited in the file of this patent
UNITED STATES PATENTS

| | | |
|---|---|---|
| 2,344,896 | Phelps | Mar. 21, 1944 |
| 2,615,069 | Gallagher | Oct. 21, 1952 |
| 2,667,892 | Gentzel | Feb. 2, 1954 |
| 2,754,842 | Hagiwara | July 17, 1956 |
| 2,834,372 | Young | May 13, 1958 |
| 2,868,499 | Kaminsky | Jan. 13, 1959 |
| 2,888,233 | Windsor | May 26, 1959 |